April 18, 1933. J. P. DOYLE 1,903,754
SELF CLEANING FISH GATE
Filed Dec. 30, 1930 2 Sheets-Sheet 1

Inventor
J. P. Doyle
By Watson E. Coleman
Attorney

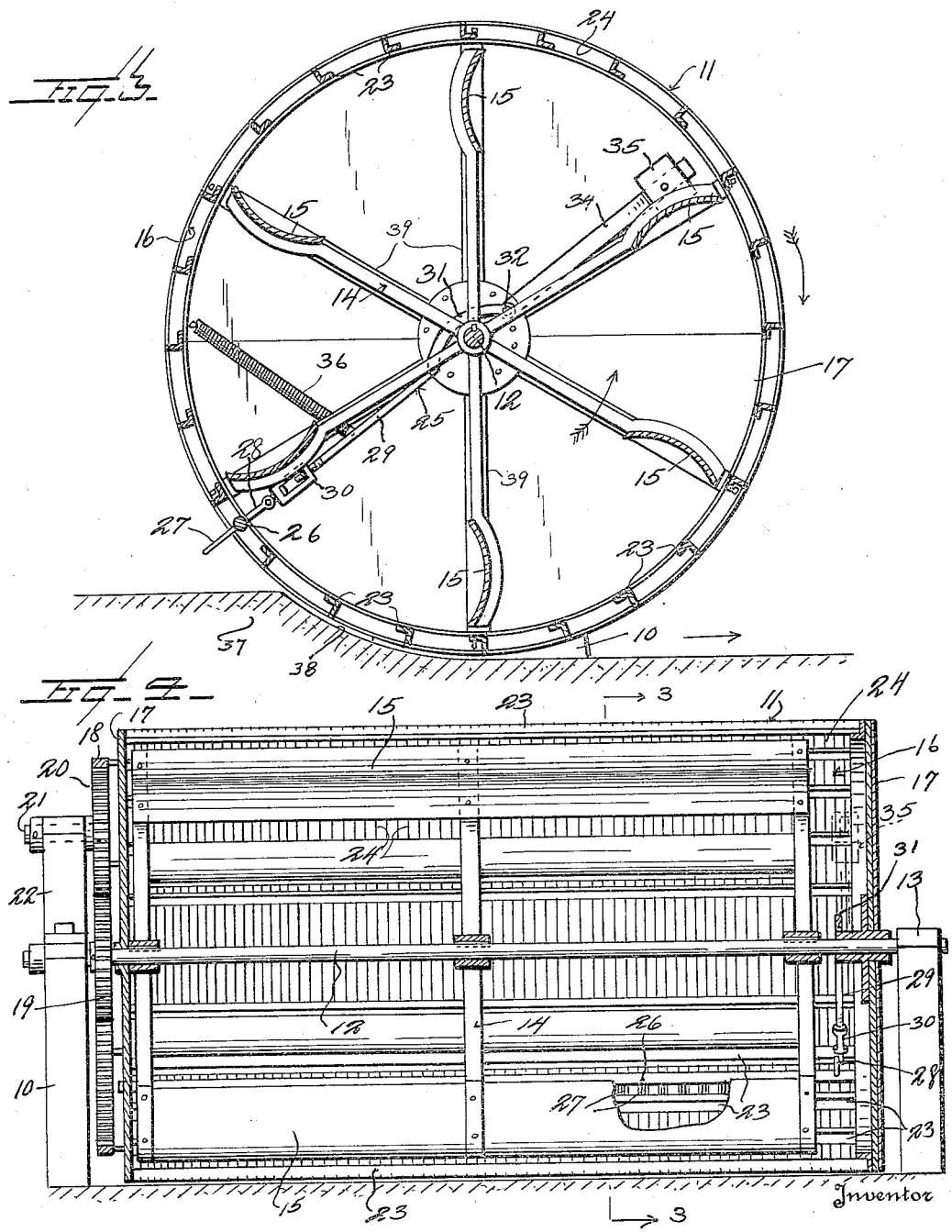

UNITED STATES PATENT OFFICE

JOHN P. DOYLE, OF LOLO, MONTANA

SELF-CLEANING FISH GATE

Application filed December 30, 1930. Serial No. 505,616.

The present invention relates to self-cleaning fish gates and the present invention constitutes an improvement of the self-cleaning fish gate disclosed in my pending application, Serial No. 460,233 filed June 10, 1930.

An object of this invention is to provide a self-cleaning fish gate which may be mounted in an irrigation canal or other stream of water and which when so mounted is adapted to be rotated by the current of water.

Another object of this invention is to provide a gate of this character with means by which floating objects or the like may be readily carried over the top of the structure and deposited on the opposite side.

A further object of this invention is to provide an automatically operated cleaning member which is actuated upon rotation of the drum so as to lift floating objects striking the forward edge of the drum over the top thereof and release them from the drum when they are deposited on the rear of the drum.

The above and various other objects and advantages of this invention will in part be described in, and in part be understood from, the following detailed description of the present preferred embodiment, the same being illustrated in the accompanying drawings, wherein:—

Figure 3 is a sectional view taken on the line 3—3 of Figure 4, and

Figure 4 is a longitudinal section partly in detail of the device.

Figure 1:
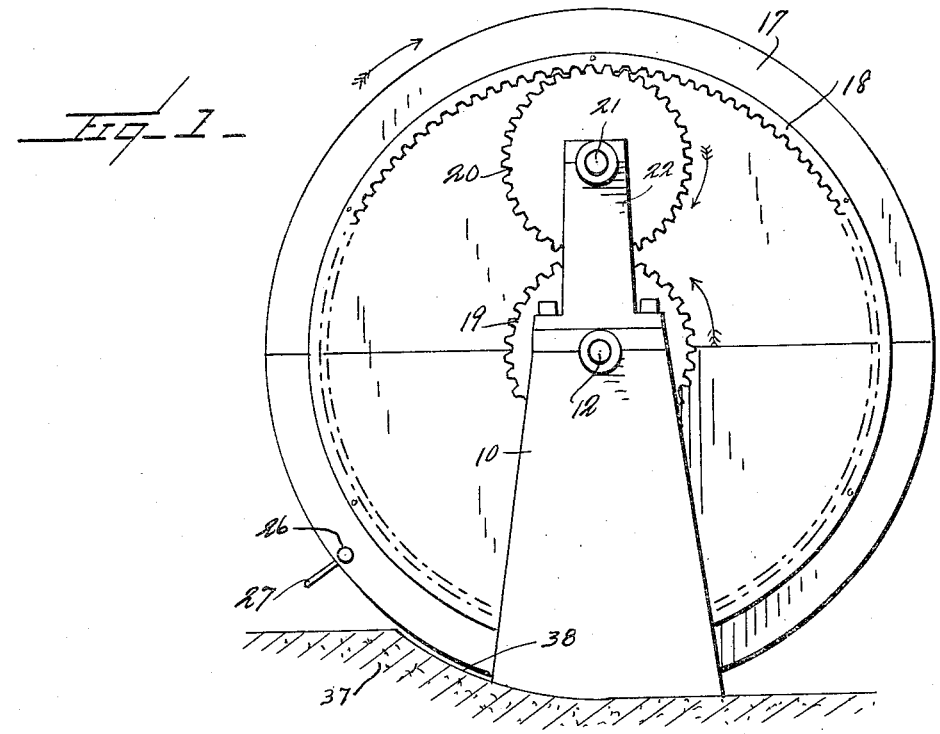
Figure 1 is a detail end elevation of a device constructed according to the preferred embodiment of this invention.
Figure 2:
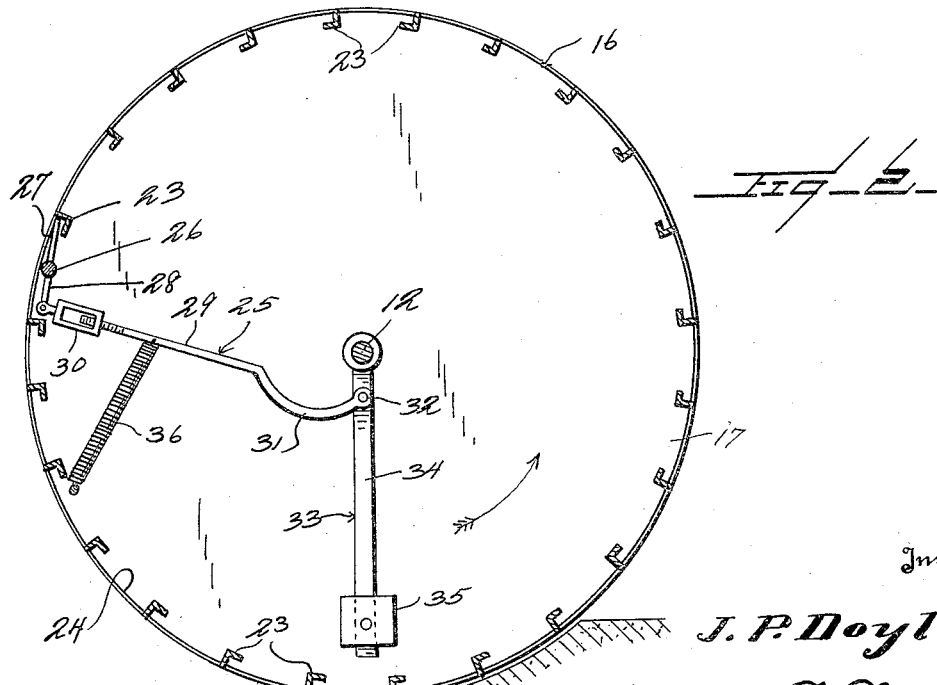
Figure 2 is a detail end elevation of the device showing the opposite end of that disclosed in Figure 1.

Referring to the drawings wherein like numerals of reference designate corresponding parts throughout the several views, the numeral 10 designates generally a supporting structure for rotatably supporting a fish gate generally designated as 11. The fish gate 11 is of cylindrical construction and is rotatably supported on a shaft 12 which is rotatably mounted in bearings 13 mounted on the upper ends of the vertically disposed supports 10. The supports 10 are preferably mounted on the opposite sides of the stream of water.

The fish gate 11 comprises an inner power or driving member generally designated as 14 which is constructed in the form of a spider or a plurality of radiating arms which are secured to the shaft 12 and are provided at the outer ends thereof with cup-shaped paddles 15 or the like. The concave surface of the paddles 15 face the stream of water so that when the stream of water strikes the paddles they will be rotated thereby.

A driven screen member comprising a cylindrical drum shaped screen structure 16 is rotatably supported on the shaft 12 by means of end members 17 and a ring gear 18 is secured to the end members 17 exteriorly of the drum 16 and is adapted for rotation thereabout.

A driving gear 19 is secured to the shaft 12 exteriorly of the end member 17 and a second or intermediate gear 20 is mounted for rotation on a stub shaft 21 which is secured to an upstanding support 22 on one of the supports 10.

Through the use of the intermediate gear 20, the ring gear 18 is rotated reversely from the rotation of the paddle member 14 and coactively with the reverse rotation of the gear 18, the drum 16 is rotated reversely from the drum or driving member 14.

The drum 16 may be constructed of a plurality of elongated bars 23 which are secured to the end members 17 and an annular screen 24 is secured to the outer face of the bars 23, the screen 24 comprising a plurality of circumferentially disposed bars or wires which are mounted on the elongated bars 23 in spaced relation to each other. By providing a circumferentially disposed screen member 24 as herein disclosed, no foreign matter in the form of grass, sticks or other floating objects will be carried over the top of the gate structure 11. In order, however, to prevent clogging of the forward face of the gate 11, I have provided a lifting member generally designated as 25 which is mounted for rotation with the outer or driven member 16 and is adapted to carry the foreign matter over the top of the gate and deposit it on the rear face thereof.

The cleaning member 25 comprises a longitudinally disposed bar 26 which is rockably mounted in the end members 17 and provided with a plurality of spaced teeth 27 which extend outwardly from the outer surface of the driven member 16 when in operative position. An eye bolt 28 is secured to the rockable bar 26 adjacent one end thereof and an elongated lever 29 is connected at one end to the eye bolt 28 by means of a threaded member or turnbuckle 30. The inner end of the lever 29 is curved, as at 31, and is rockably secured by means of a pintle 32 to a weighted member 33 mounted on the shaft 12 interiorly of the outer screen member 16. The weighted member 33 comprises an elongated arm 34 which at one end thereof loosely engages the shaft 12 and at the opposite end is provided with a weight 35.

A tensioning member in the form of a spring 36 is secured at one end to the lever 29 adjacent the outer end thereof and the opposite end of the spring 36 is secured to the driven member 16. The spring 36 is provided so as to constantly urge the rockable member 26 into inoperative position or so that the teeth 27 will be swung substantially tangentially of the outer surface of the driven member 16. As the driving member 14 is rotated in one direction by the current of water, the driven member 16 will be rotated in the opposite direction and in like manner the cleaning member 25 will be rotated coactively with the rotation of the driven member 16.

Preferably a bottom structure 37 in the form of an inclined runway which has a curved upper face portion 38 is positioned in the bottom of the flowing stream of water and as the driven member 16 rotates, the cleaning member 27 will be rotated thereabout and urged into inoperative position by means of the tensioning member 36. However, when the cleaning member 25 reaches the upper edge portion of the inclined runway 37, the pendulum or weighted member 33 will be substantially diametrically opposed thereto and the weight 35 will swing the cleaning member 25 into outstanding or operative position, which position will be maintained until the cleaning member 25 has reached the uppermost position whereupon the spring 36 will pull the rockable bar 26 in a reverse direction or away from the material positioned against the teeth 27. This inoperative position will be maintained until the weighted member 33 again reaches the uppermost position, whereupon the weight will gravitatingly swing downwardly and the curved portion 33 of the lever 29 will extend about the shaft 12 so that the weighted member 33 will be maintained in substantial alinement with the lever 29 for a distance slightly in excess of one-fourth of the rotation of the cleaning drum 16.

It will be obvious from the foregoing that any sticks, grass or obstructing material which strikes the cleaning gate 11 at the forward face thereof will be carried over the top of the gate and released on the opposite side. This cleaning operation is automatic and while I have shown the cleaning structure as mounted on the cleaning gate disclosed in my pending application, Serial Number 460,233, I of course, do not wish to be limited to this construction as, if desired, the cleaning structure 25 may be mounted on any fish gate structure wherein the outer drum or screen operates reversely from the inner structure.

The end members 17 may be constructed in the form of a split disc or plate constructed of metal or the like and secured to spokes 39 which hold the screen 16 concentrically of the shaft 12. Through the use of these end plates 17, no foreign matter such as grass, sticks or the like can enter the interior of the gate structure at the ends thereof and these plates 17 may be readily removed so as to take out or repair the driving paddles 15.

It is, of course, understood that various changes and modifications may be made in the details of construction and design of the above specifically described embodiment of this invention without departing from the spirit thereof, such changes and modifications being restricted only by the scope of the following claims.

I claim:—

1. A self-cleaning fish gate of the character described, comprising a power member, means for mounting said power member in a flowing stream, a rotatable screen structure connected to said power member and adapted for rotation reversely therefrom, an elongated toothed cleaning member rockably mounted on said screen structure, means for rocking said toothed cleaning member into operative position during one cycle of the rotation of said screen structure, and resilient means carried by said screen structure and engaging said cleaning member whereby to swing said cleaning member into inoperative position during another cycle in the rotation of said screen structure.

2. A self-cleaning gate of the character described, comprising a rotatable screen structure, a rockable cleaning member carried by said screen structure and operating means for said cleaning member actuated by rotation of said screen structure, said operating means comprising a weighted member, means for connecting said weighted member to said cleaning member and resilient means engaging said connecting means whereby to rock said cleaning member into inoperative position during one cycle of the rotation thereof.

3. In a fish gate structure including a rotatable screen drum, a shaft for the drum, a rockable cleaning member rotatable with said drum, and means actuated by gravity and losely engaging the shaft for rocking said cleaning member into operative position during a portion of the rotation of said drum.

4. In a fish gate structure including a rotatable drum, a shaft for the drum, a toothed bar pivotally carried by the drum adjacent the periphery thereof, a weight swingably carried by said shaft, and means connecting said weight with said bar whereby to rock said bar into operative position coactively with the swinging of said weight.

In testimony whereof I hereunto affix my signature.

JOHN P. DOYLE.